Nov. 30, 1948.  F. J. KENNEDY  2,455,180
THIN-WALL TUBING CONNECTOR
Filed May 13, 1947  2 Sheets—Sheet 2
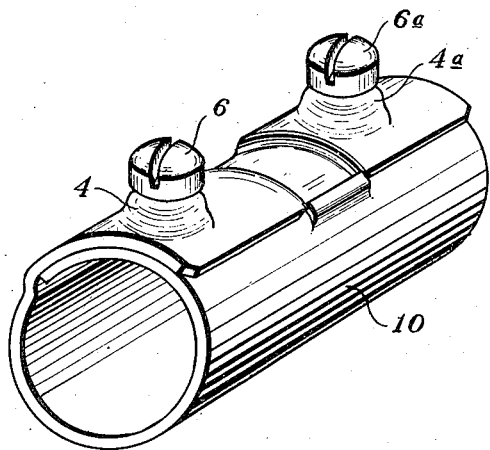
Fig. III
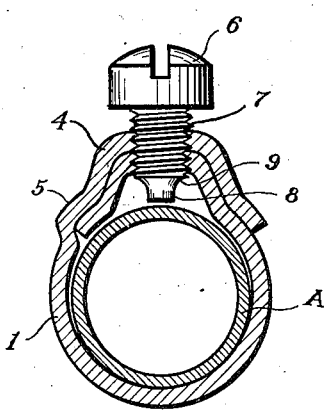
Fig. V
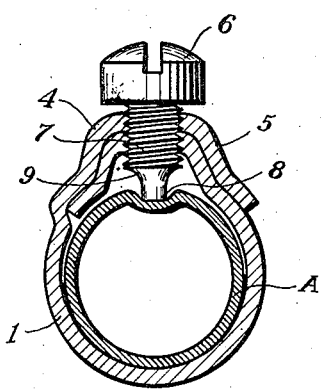
Fig. VI
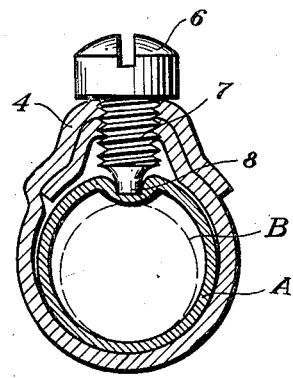
Fig. VII
INVENTOR.
Frank J. Kennedy
BY
William B. Wharton
his attorney

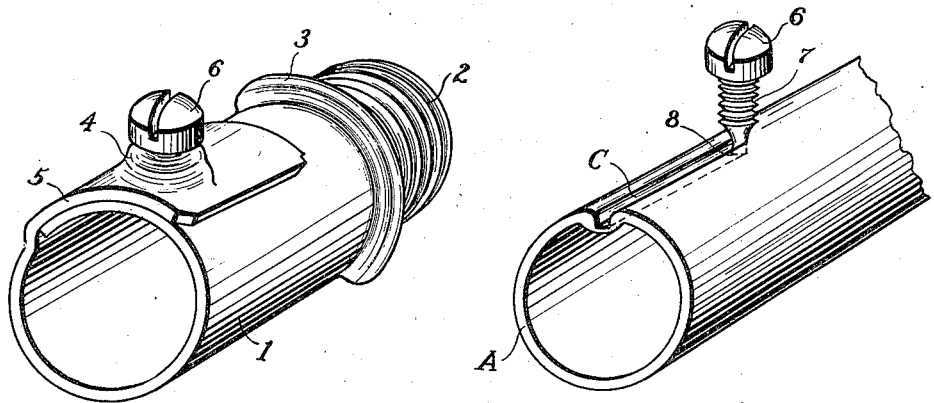
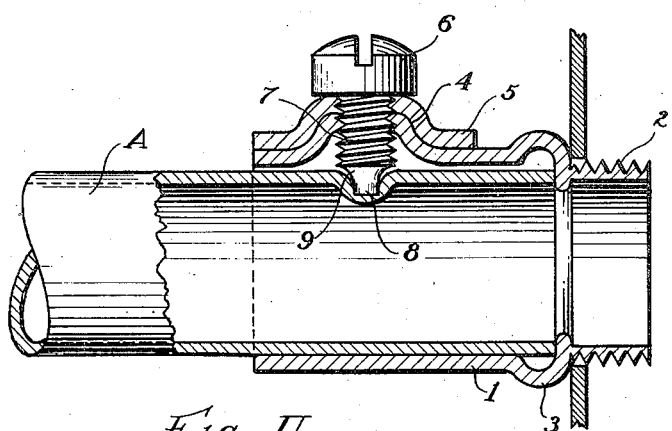
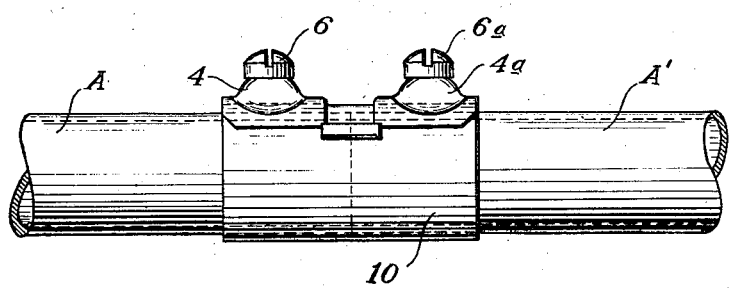

UNITED STATES PATENT OFFICE 2,455,180

THIN-WALL TUBING CONNECTOR

Frank J. Kennedy, Brooklyn, N. Y., assignor to National Electric Products Corporation, Pittsburgh, Pa., a corporation of Delaware Application May 13, 1947, Serial No. 747,665

2 Claims. (Cl. 285—168)

This invention relates to a thin-wall tubing connector, the word "connector" being herein used to designate a device for coupling two lengths of thin-wall tubing, as well as to designate a device for connecting a length of thin-wall tubing to a structure of diverse sort or form.

It is well understood that it usually is impractical to thread thin-wall tubing, that is tubing having a wall thickness of about one-sixteenth inch or less; and for use as electrical conduit and connections Underwriters' Laboratories do not permit such threading. It is therefore impossible to use as a connector for thin-wall tubing the threaded sleeves usually employed to interconnect length of tubing of greater wall thickness, or to use threaded hubs, or the like, to which a threaded end of the tubing directly is engaged.

Various sorts and kinds of connector have been used or proposed for the connection of light-wall tubing. Rather complicated collapsible ring type connectors requiring the use of wrenches in their attachment and other types of connectors requiring bulky leverage tools having been devised. In many locations in which thin-wall tubing is used, as for instance to house electrical conductor wires run along the inner wall, ceiling or floor surfaces of buildings, the working space for making connection between lengths of the tubing during installation is strictly limited. For this reason resort has been had to set screws for engaging the sleeve elements of connectors to the tubing, so that a screw-driver may be used to make the connection. Here again practical considerations and the desirability of obtaining the approval of Underwriters' Laboratories for use of the connectors in electrical duct, have created serious problems. Thus there are fixed requirements as to endurance of the connection against severe pull-out tests, screws must not reduce the diameter of the tubing regionally by more than 15%, the interior surface of the tubing must not be roughened or torn, because such condition would damage the insulation of electrical conductors in the tubing, the connection must be such as to give good grounding continuity throughout the length of the tubing installation, and the connection must be such as to sustain bending tests performed by bending the tubing in a region adjacent the connection. For whatever purpose the thin-wall tubing is used, quite obviously it must not be perforated by the connector.

The object of this invention is to provide a connector for light-wall tubing which is simple and which is easily installed even in relatively inaccessible places by means of simple and appropriate tools; and which connector effects a connection of thin-wall tubing which is highly resistant to pulls and bends, which gives good electrical conductivity and which does not produce roughness or sharp edges interiorly of the tubing.

Another object of the invention is to provide in the connector structure simple indicating means which show clearly when the fastening operation has been satisfactorily performed.

Another object of the invention is to provide a thin-wall tubing connector of the indicated sort by which a firm conductive engagement with the tubing is made with minimized constriction of the tubing in the locality of the engagement.

In the accompanying drawings, illustrative of an embodiment of my invention:

Fig. I is an isometric view of the form of the connector which is adapted to the connection of a length of thin-wall tubing to the hub of a junction box or other structure by threading on the connector.

Fig. II is a longitudinal sectional view showing the engagement of a length of thin-wall tubing by a connector of the form shown in Fig. I.

Fig. III is an isometric view of a connector in accordance with my invention of the form adapted to the inter-connection of two lengths of thin-wall tubing.

Fig. IV is a side elevational view showing two lengths of thin-wall tubing interconnected by a connector of the form shown in Fig. III.

Fig. V is a cross sectional view showing a connector which may be either of the form shown in Fig. I or the form shown in Fig. III in position on a length of thin-wall tubing before the connector is acted on to engage the tubing.

Fig. VI is a similar view showing an intermediate stage in the engagement of the tubing by the connector.

Fig. VII is a similar view showing the final stage in the operation of the connector, in which stage the tubing is definitely engaged.

Fig. VIII is an isometric view, which also is appropriate to both forms of the connector, showing the condition of a length of thin-wall tubing which has been pulled away from the connector by an excessive pulling force, and showing the engagement screw of the connector returned to its initial position with respect to the tubing.

It should be understood that all figures of the drawings except Fig. IV show the connector and the tubing, where the latter is included, on a scale substantially larger than the usual size of the connector and tubing. When used as electrical duct the thin-wall tubing most generally used has an inside diameter of ⅝ inch and a wall thickness of about 0.042 inch. Although the connector is described herein with particular reference to its use in connecting thin-wall tubing used as electrical duct, the advantageous features of the connector make it useful in the connection of thin-wall tubing in any of its general or special uses. Those advantageous features reside in a combination of elements and in the cooperative form and arrangement of those elements.

Generally to describe the connector, the direct engaging element of the connector assembly is a screw mounted in a sleeve which surrounds the thin-wall tubing to be engaged and which may be caused to engage the tubing by the simple action of a screwdriver; a tubing-engaging terminal on said screw formed to engage the tubing with particular firmness by limited indentation and limited penetration of the tubing wall; and a mounting boss for the said screw cooperative with the formation of the tubing-engaging terminal of the screw giving a long threading of the screw, definitely and firmly to present the screw terminal at a desired angle to the periphery of the tubing. As an added function the mounting boss serves positively to limit extension of the screw terminal interiorly of the connector sleeve and acts as a gauge to indicate perfected engagement of the tubing. Also in cooperation with the long threaded mounting of the engagement screw, abutment of the screw head resists turning movement of the screw under a pulling force on an engaged length of tubing.

Referring now to Figs. I and II of the drawings, the form of the connector shown therein comprises a sleeve 1. At one end of the sleeve there is a threaded region 2 extended outwardly from a stop-collar 3 for engagement with a junction box or analogous structure. The main portion of sleeve 1, rearwardly of collar 3, is constructed to engage a length A of thin-wall tubing. Sleeve 1 is formed to provide a radially positioned threaded tubular extension or screw mounting boss 4, the functions of which have been generally described. One of the many ways of forming the boss is, as illustrated to provide an overlapping extension 5 of sleeve 1 to give an increased wall thickness for threaded engagement with a screw, and regionally to deflect both the inner wall of sleeve 1 and the overlap 5 outwardly to form the boss.

The engaging screw has a kerfed head 6 which stands above boss 4 and a shank 7 which is threaded into a bore through the boss. As shown in the drawings, the bore in which the engaging screw runs is of a length to give an engagement for several turns of the screw thread. This tends to give an accurate and secure positioning of the screw with respect to a diametric plane of sleeve 1 which bisects the boss, by preventing tilting movement of the screw. The terminal of the screw thus is presented at all times in the same relation to the outer surface of tubing embraced by the connector.

The inner or terminal portion of the screw which comes into direct contact with the tubing is of specialized form. This tubing-engaging terminal of the screw comprises a constricted tip 8 of cylindrical form which presents an approximately plane terminal surface to the outer surface of the tubing and a curved surface 9 which merges with the greater diameter of the screw shank. That is, the tip 8 is of substantially lesser diameter than the threaded portion or shank of the screw, but for strength its upper region is of progressively increased diameter so that it does not form an abrupt shoulder with the shank. The relatively small diameter of the cylindrical tip is of importance, inasmuch as it permits the tip bodily to bite into the wall of the tubing. It is also of importance that the presented surface of the screw terminal be approximately plane, because a pointed tip would perforate the tubing if urged into it forcefully and a rounded surface would fail to give adequate engagement. It also is of importance, as will be explained, that the approximately plane surface of the cylindrical tip is presented accurately to the wall of the tubing properly to perform its function.

Turning now to Figs. V, VI, and VII of the drawings, Fig. V shows the terminal of the tubing-engaging screw presented to the tubing before the screw is run down in its threaded engagement with boss 4. In these figures of the drawings the long threaded bearing between the boss and the threaded shank of the screw is clearly shown. Fig. VI shows the screw partially run down, initially to indent the tubing A. In Fig. VII the screw has been fully run down so that its head 6 has been brought into contact with the upper surface of boss 4 as a stop. The cylindrical tip 8 of the screw terminal is shown as not only having indented but also having bitten into the wall of the tubing to a limited extent. Also it will be observed that the indentation of the tubing does not extend so far as regionally to constrict the tubing beyond the permissible limit indicated in Fig. VII by broken line B. The limitation of inward movement of the screw provided by contact of screw head 6 with boss 4 defines the length of screw movement which gives a maximum of engagement without either undue indentation or unpermissible perforation of the tubing wall. This positive limitation to the inward movement of the engagement screw is of greater importance than might appear at first glance, because it frequently is desirable that the tip of the screw should penetrate the thin wall of the tubing to within very few thousandths of an inch without perforation. Also, by making the tubing-engaging position of the screw one in which the screw head abuts the outer end of the tubular extension or screw-mounting boss 4, such abutment contributes added resistance to turning movement of the screw under a longitudinal pull on tubing engaged by the connector.

It may be explained that the engagement provided by the connector, as illustrated in Fig. VII, is the optimum screw engagement of thin-wall tubing, consisting as it does in a combination of limited indentation and limited penetration. Underwriters' Laboratory requirements are that the engagement withstand a straight pull of 500 pounds for thin-wall tubing of ½ inch inside diameter and a straight pull of 700 pounds for thin-wall tubing of ¾ inch inside diameter. The engagement provided in the manner illustrated in Fig. VII exceeds those requirements by about 50% in each instance. Also because of the long bearing between the threaded region of the tubing-engaging screw and the bore of its mounting boss, tortional forces caused by bending the tubing do not tend to work the screw terminal loose from its engagement with the tubing.

Fig. VIII illustrates the result when a pull has been exerted on the tubing which is so excessive that the engagement of the tubing is destroyed.

As shown in that figure of the drawings a groove C has been formed in the tubing A. That groove C is produced not only by extending the indentation caused by the cylindrical tip of the screw terminal to the end of the tubing but also by tearing out the metal of the tubing to the depth to which the tip has penetrated and in a width equal to the diameter of the tip. It will be apparent that a maximum of difficulty is encountered in breaking the connection in such manner.

Also it may be explained that if the screw terminal were pointed it would not only tend to cause unpermissible perforation of the tubing wall but that it would be relatively easy to tear out the metal of the tubing along the narrow line caused by such penetration. If the screw tip were rounded, relatively slight force would be required to iron out a groove from the location of the engagement to the end of the tube. Further if the threaded shank of the screw were engaged in the sleeve of the connector by a relatively narrow effective threading, the force of a severe pull on the tubing would tend to tilt the screw so that a sharp edge at the tip of the screw rather than the cylindrical body of the tip would act on the tubing wall. This cutting edge would tend readily to plow along the tubing wall so that the engagement would be broken with the exertion of much less force than is required in pulling against the entire diameter and depth of penetration of the screw tip.

So far the connector of my invention has been described with reference to the particular form shown in Figs. I and II of the drawings. The form of the connector shown in Figs. III and IV is in all substantial respects identical both in structure and in function. It differs from the form of the connector shown in Figs. I and II merely in duplicating the tube-engaging assembly of the connector so that the sleeve 10 of the connector comprises two mounting bosses 4 and 4a, the latter of which replaces the threaded region 2 of the form previously described. Similarly, the connector comprises two tubing-engaging screws, the heads 6 and 6a of which appear in Figs. III and IV of the drawings, and Fig. IV shows this modified form of the connector in embracing relation with two lengths of tubing A and A' which are engaged in end abutment within the connector sleeve.

The cylindrical screw tip has been described as being constricted, that is of a diameter less than the diameter of the screw shank. The diameter of the tip cannot be critically defined either in arbitrary units of measurement or in a set ratio with respect either to the shank of the screw or the gauge of the tubing wall. It is possible only to say that the screw tip is constricted to such diameter that its approximately plane terminal surface is capable of embedding itself in the wall structure of the thin-wall tubing as well as indenting the said wall, and that it is of diameter sufficient to require the formation of a groove of substantial width as well as of substantial depth by both progressive indentation and progressive tearing in order forcibly to remove the tubing from engagement by the connector.

It will be seen from the foregoing that the connector of my invention comprises a combination of elements which gives maximum engagement of the connector with the thin-wall tubing in the simplest possible manner, without destructive effect on the tubing wall and without undue distortion of the tubing. Thus the plane surface of the screw tip gives combined indentation and penetration of the tubing wall which presents maximum resistance to disengagement of the tubing. This maximum resistance in turn requires that the screw be so well supported that it does not readily tilt to present a cutting edge to the tubing wall. Maximum penetration is possible because of the positive limitation to penetration provided by the same structure which inhibits tilting of the screw. Concretely to state the merits of my thin-wall tubing connector, it renders a simple screw engagement effective and satisfactory in making connection with thin-wall tubing for use as electrical duct and for numerous other purposes.

I claim as my invention:

1. A thin-wall tubing connector comprising a tubing-embracing sleeve including an external tubular projection providing a bore of substantial length diametrically positioned with respect to tubing embraced by said sleeve and threaded to receive the shank of an engagement screw, an engagement screw having a shank threaded in the bore of said projection and a constricted penetrative cylindrical tip having an approximately plane terminal surface presented diametrically to tubing embraced by the said sleeve, and means cooperative between the said engagement screw and the said sleeve to determine the extent of the indenting and embedded engagement of embraced tubing by the said constricted cylindrical tip of the screw.

2. A thin-wall tubing connector comprising a tubing-embracing sleeve, an external tubular projection from said sleeve providing a bore of substantial length diametrically positioned with respect to tubing embraced by the sleeve, and an engagement screw having a head outwardly of the said projection, a shank threaded in the bore of said projection and a constricted penetrative cylindrical tip having an approximately plane terminal surface presented diametrically to the tubing embraced by the said sleeve, the length of the said engagement screw beneath the head thereof being sufficiently short with respect to the length of said threaded bore and associated structure of the connector sleeve that in engagement of tubing by the connector the screw head abuts the outer end of the said projection in cooperation with the threaded engagement of the screw in said bore to prevent tilting movement of the screw under a pull exerted on tubing engaged by the connector.

FRANK J. KENNEDY.

REFERENCES CITED

The following references are of record in the file of this patent:

UNITED STATES PATENTS

| Number | Name | Date |
| --- | --- | --- |
| 268,686 | Kaiser | Dec. 5, 1882 |
| 671,763 | Greenfield | Apr. 9, 1901 |
| 789,107 | Stefle | May 2, 1905 |
| 958,752 | Mackensen | May 24, 1910 |
| 1,193,884 | Church | Feb. 24, 1931 |